United States Patent
Alavoine

(10) Patent No.: US 6,237,090 B1
(45) Date of Patent: May 22, 2001

(54) SYNCHRONOUS OR ASYNCHRONOUS RESETTING CIRCUIT

(75) Inventor: Olivier Alavoine, Seyssins (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/173,055

(22) Filed: Oct. 15, 1998

(30) Foreign Application Priority Data

Oct. 16, 1997 (FR) .................................................. 97 12968

(51) Int. Cl.[7] .................................................... G06F 9/445
(52) U.S. Cl. .................................................................. 713/1
(58) Field of Search ............................................. 713/1, 2

(56) References Cited

U.S. PATENT DOCUMENTS 4,464,584   8/1984   Hentzschel et al. .
5,323,066   6/1994   Feddeler et al. .

FOREIGN PATENT DOCUMENTS 41 32 397 A1   4/1993   (DE) .................................. G06F/9/24
2 308 687      7/1997   (GB) .................................. G06F/1/24

*Primary Examiner*—Thomas M. Heckler
(74) *Attorney, Agent, or Firm*—Theodore E. Galanthay; Allen, Dyer, Doppelt, Milbrath & Gilchrist, P.A.

(57) ABSTRACT

A primary circuit produces an internal resetting signal as a function of two input signals: an external resetting signal and a clock signal internal to the microprocessor. Depending on the characteristics of these two input signals, the internal resetting signal is generated according to a synchronous or an asynchronous mode. Generation of the internal resetting signal is delayed when the selection signal corresponds to the synchronous resetting mode.

18 Claims, 3 Drawing Sheets

SYNCHRONOUS OR ASYNCHRONOUS RESETTING CIRCUIT

FIELD OF THE INVENTION

The present invention relates to the operation of microprocessors and microcontrollers, and more particularly, to systems for resetting microprocessors and microcontrollers.

BACKGROUND OF THE INVENTION

The resetting of a microcontroller may be controlled externally by a user. The user often has the capability for resetting the microcontroller by simply pressing an appropriate key. The resetting may also take place without any external command during activation of a signal known as a "watch-dog" signal.

The microcontroller includes a microprocessor and a set of program memories. When a central processing unit (CPU) of the microprocessor is active, it periodically sends out a signal to the watch-dog circuit. This signal confirms operation of the CPU. When the CPU becomes inactive for a certain period, the watch-dog circuits sends out a watch-dog signal for prompting resetting of the microprocessor. Whether resetting of the microprocessor has been decided by the user or whether it has occurred following transmission of the watch-dog signal, a resetting signal internal to the microprocessor is generated. The microprocessor is then initialized to a predefined default state.

The internal resetting signal is active for a period of time, which is dependent upon characteristics of each microprocessor. This time represents the duration of the internal resetting sequence. The external resetting signal or the watch-dog signal may remain active for a period greater than this characteristic time. Accordingly, the internal resetting signal remains active for as long as these other signals are active. When the internal resetting signal is no longer active, the microprocessor restarts an execution program from a predefined memory address. A resetting routine designed for the specific configuration of the peripherals and registers of the microprocessor is then executed.

There are two types of resetting modes: synchronous resetting and asynchronous resetting. Synchronous resetting assumes the existence of a clock signal generated by a clock internal to the microprocessor. When the user employs external means to initiate a resetting of the microcontroller, a certain amount of time defined by a predetermined number of internal clock pulses elapses before the internal resetting signal becomes active.

In other words, synchronous resetting is effective only when the internal resetting signal is active. The internal resetting signal thus has the essential function of placing all the characteristic elements of the microcontroller into a predefined default state. These characteristic elements primarily include flip-flop circuits.

Asynchronous resetting does not require the prior existence of a clock internal to the microcontroller. As soon as the external resetting signal is activated by the user, the internal resetting signal becomes active. Accordingly, the microcontroller is immediately configured to the default state.

An advantage of synchronous resetting is that it allows the microcontroller time to terminate operations in progress, especially write operations. During a synchronous resetting, a risk of loss of essential information is thus limited. However, if a synchronous resetting is initiated just after the microcontroller is powered on, then a situation of high energy consumption exists. This may cause damage within the microprocessor because the internal clock of the microprocessor appears only at the end of a certain period of time after the microprocessor has been powered on. In other words, the resetting signal cannot synchronize with the internal clock. The same type of problem arises when the internal clock disappears accidentally during the use of the microprocessor. The system is therefore in an indeterminate state until reappearance of the internal clock.

Asynchronous resetting is an approach to the above described problem associated with synchronous resetting. That is, a problem arises when a resetting signal for a synchronous resetting mode cannot synchronize with the internal clock. However, an asynchronous resetting mode cannot be used to complete operations in progress. Therefore, loss of information is frequent. At worst case, the CPU carries out a write operation randomly in an unspecified memory. There is thus the risk of losing essential data. The choice between synchronous resetting and asynchronous resetting raises a problem.

It would be desirable to have a choice between generating a synchronous resetting signal when the clock internal to the microprocessor exists, and generating an asynchronous resetting signal when this clock no longer exists or has just failed. Hereinafter, only microprocessors shall be referred to. However, all that is described may apply to microcontrollers.

SUMMARY OF THE INVENTION

A resetting signal is delayed when an internal clock signal of the microprocessor is active, and the resetting signal is immediately applied when the internal clock signal is inactive.

An object of the invention is to provide a microprocessor comprising a primary resetting circuit. The primary resetting circuit includes a first input to receive an initial resetting signal external to the microprocessor, and a second input to receive a clock signal internal to the microprocessor. An output of the primary resetting circuit provides a resetting signal internal to the microprocessor as a function of the external resetting signal and as a function of the internal clock signal. The primary circuit further comprises an additional input for receiving a selection signal to set the primary circuit in a resetting mode, which is either synchronous or asynchronous, and to produce the internal resetting signal with an appropriate delay.

BRIEF DESCRIPTION OF THE DRAWINGS

The different aspects and advantages of the invention will appear more clearly in the remainder of the description when made with reference to the figures. The figures are given purely by way of an indication of the invention and in no way restrict the scope of the invention.

Of these figures.

DETAILED DESCRIPTION OF THE PREFERRED EMBODIMENTS

Figure 1:
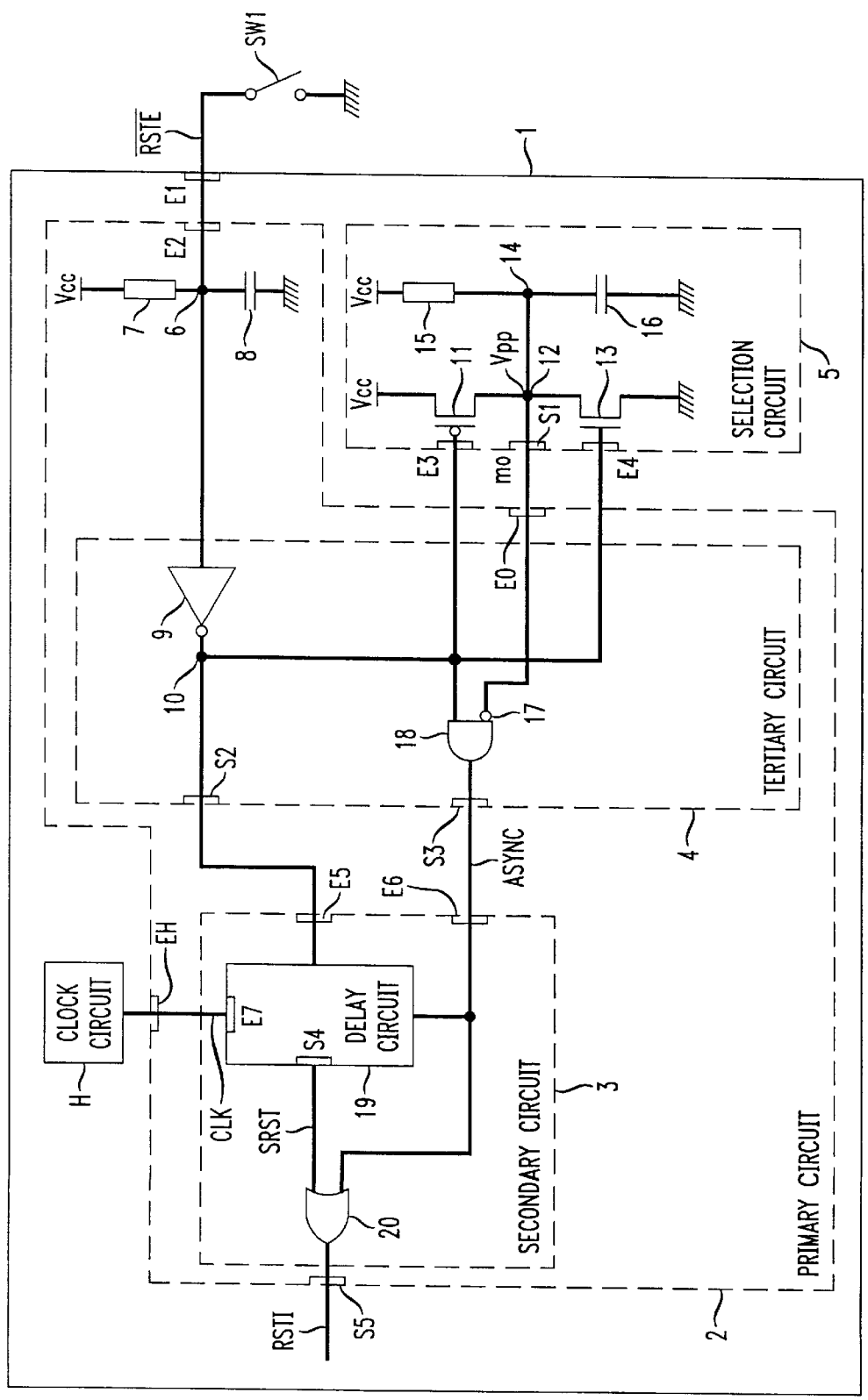
FIG. 1 illustrates a microprocessor having an internal circuit for obtaining a synchronous or an asynchronous resetting in accordance with the invention.

FIG. 1 illustrates a microprocessor 1 having an internal circuit for initiating a synchronous or an asynchronous resetting depending on the state of the microprocessor 1. The microprocessor 1 is controlled at an input E1 by a switch SW1. When switch SW1 is in a closed position, for example, input E1 is connected to ground. The input E1 then receives an external resetting signal RSTE that signifies the state of the external resetting control. The closed position of the switch SW1 thus corresponds to an action of the user to reset the microprocessor 1. An active external resetting signal RSTE is a low level signal (zero).

The microprocessor 1 comprises several circuits, such as a primary circuit 2, a clock circuit H, and a selection circuit 5. The clock circuit H delivers a clock signal CLK which enters the primary circuit 2 by an input EH. The primary circuit 2 has an input E2 connected to the input E1 of the microprocessor 1. The primary circuit 2 also has an input EO for receiving an output signal from the selection circuit 5.

The primary circuit 2 selects between synchronous and asynchronous resetting as a function of a signal generated by the selection circuit 5. Depending on the type of resetting selected, the primary circuit 2 prompts a delay between the external resetting signal RSTE and an internal resetting signal RSTI.

The primary circuit 2 comprises a secondary circuit 3 and a tertiary circuit 4. The input E2 is connected to a node 6. Connected in parallel to node 6 is a resistor 7 and a capacitor 8. The other terminal of the resistor 7 is connected to a first supply potential Vcc of the microprocessor 1, and the other terminal of the capacitor 8 is connected to ground. An inverter 9 having an input is also connected to the node 6, and an output of the invertor 9 is connected to node 10.

Inputs E3 and E4 of the selection circuit 5 are also connected to the node 10. The input E3 controls a gate of a P channel transistor 11. A source of the transistor 11 is connected to the first potential Vcc, which, in a preferred embodiment, is generated by the microprocessor 1. A drain of the transistor 11 is connected to a node 12. The input E4 controls a gate of an N channel transistor 13 having a drain connected to the node 12, and having a source connected to ground. These two transistors 11, 13 form a discharging circuit.

A node 14 is coupled to the node 12. Connected in parallel to node 14 is a resistor 15 and a capacitor 16. The other terminal of the resistor 15 is connected to the first potential Vcc, and the other terminal of the capacitor 16 is connected to ground. The resistor 15 and the capacitor 16 form a charging circuit supplied with the first potential Vcc.

A second potential Vpp provides a voltage measured at the node 12. The selection circuit 5 has an output S1 connected between the node 12 and the input EO of the primary circuit 2. The output S1 is also connected to an inverter 17. An output of the inverter 17 is connected to a first input of an AND gate 18. The output S1 provides a selection signal mo. Selection signal mo is based upon a measurement of the potential Vpp internal to the microprocessor 1. A second input to the AND gate 18 receives a signal from node 10.

The tertiary circuit 4 receives the signals provided by node 6 and node 12. The tertiary circuit 4 comprises the inverter 9, the inverter 17, and the AND gate 18. The tertiary circuit 4 has two outputs S2 and S3 which are respectively connected to the node 10 and to an output of the AND gate 18. These outputs S2 and S3 are respectively connected to inputs E5 and E6 of the secondary circuit 3. The output S3 delivers a signal ASYNC which signifies an asynchronous resetting.

The secondary circuit 3 also receives via input E7 the internal clock signal CLK of the microprocessor 1. The inputs E5, E6 and E7 of the secondary circuit are also used as inputs for a delay circuit 19 internal to the secondary circuit 3. This delay circuit 19 has an output S4 providing a signal SRST which signifies a synchronous resetting. The output S4 is connected to a first input of an OR gate 20. A second input of the OR gate 20 is connected to input E6. Output S5 of the OR gate 20 provides an output of the primary circuit 2 for the internal resetting signal RSTI.

To understand the working of this circuit, different examples are presented. A first example assumes that the user performs an external resetting operation by closing switch SW1 before the internal clock of the microprocessor 1 has been initiated. As a result of closing switch SW1, node 6 is connected to ground and its potential is therefore zero. An output of the inverter 9 is a high level signal (one) which is applied to node 10. Since the node 10 is connected to the gate of the P channel transistor 11, the P channel transistor 11 is off. In contrast, since the node 10 is connected to the gate of the N channel transistor 13, this transistor is on. Thus, the capacitor 16 is discharged through the N channel transistor 13. The capacitor 16 is very weakly charged through resistor 15 because of the recent powering-on of the microprocessor 1.

At the input of the inverter 17 is a low level signal (zero), wherein the inverter 17 provides a high level signal at the output. The two input signals applied to the AND gate 18 corresponding to node 10 and the output of the inverter 17 are therefore at a high level. The output S3 of the tertiary circuit 4 is likewise a high level signal. Hence, the output of the OR gate 20 is an active signal RSTI after the user activates the external resetting means. It is noted that the transition time of the logic gates must be taken into consideration.

Therefore, an asynchronous resetting signal is provided in the absence of the internal clock of the microprocessor 1. Thus, the invention avoids excessive power consumption and the loss of data, which would have been caused if the generation of internal resetting signal was delayed while allowing the microprocessor 1 to synchronize with the internal clock H.

As a second example, assume that the microprocessor 1 has been powered on long enough so that the capacitor 8 has had time to charge via resistor 7. Accordingly, there is a positive potential at node 6 and a low level signal (zero) is applied to node 10 by the output of the inverter 9.

Furthermore, capacitor 16 is charged via the resistor 15 because the potential Vcc is present when the microprocessor 1 was powered on. Hence, there is a high level signal at node 12, which corresponds to a low level signal at the output of the inverter 17. Consequently, the output of the AND gate 18 is at zero and the output of the OR logic gate 20 will therefore depend solely on the output S4 of the delay circuit 19.

If the user now performs an external resetting operation, node 6 has a zero potential which in turn provides a high level signal at node 10. The delay circuit 19 therefore receives a high level signal at its input E5 and the internal clock signal at input E7. This prompts the generation, at output S4, of a high pulse signal after a certain number of pulses of the internal clock have elapsed. Hence, at the output of the OR gate 20 is a high pulse and the internal resetting signal RSTI is active. Operation of the delay circuit 19 is examined in detail further below.

Thus, a synchronous resetting signal is generated in the sense that a certain period of time has elapsed between the external resetting signal initiated by the user and the internal resetting signal generated at the output of the primary circuit 2. This delay permits essential write operations in the registers of the microprocessor 1 to be performed.

Furthermore, the capacitor 16 has had time to charge via the resistor 15 between powering-on of the microprocessor 1 and the external resetting initiated by the user. The potential Vpp at the node 12 is at a high level. The positive voltage sent to the gate of the N channel transistor 13 will cause a gradual drop in the potential of the node 12. The time of this potential drop is determined by the characteristics of the N channel transistor 13. This time is necessarily greater, at least when Vpp is equal to Vcc, than the time needed to perform the last write operations and the time taken for the internal resetting sequence.

After a certain period of time, the inverter 17 may provide a high level signal at its output. This particular situation may arise especially in the case of the loss or dysfunctioning of the internal clock. The delay circuit 19 then is no longer in a position to provide a high level signal at output S4 as shall be described in greater detail below.

The internal resetting signal RSTI is therefore produced in a different manner. The two input signals applied to the AND gate 18 are both at a high level. The OR gate 20, by means of the signal ASYNC which is applied to the input E6 of the secondary circuit 3, receives a high level signal and therefore delivers a high level signal RSTI.

Figure 2:
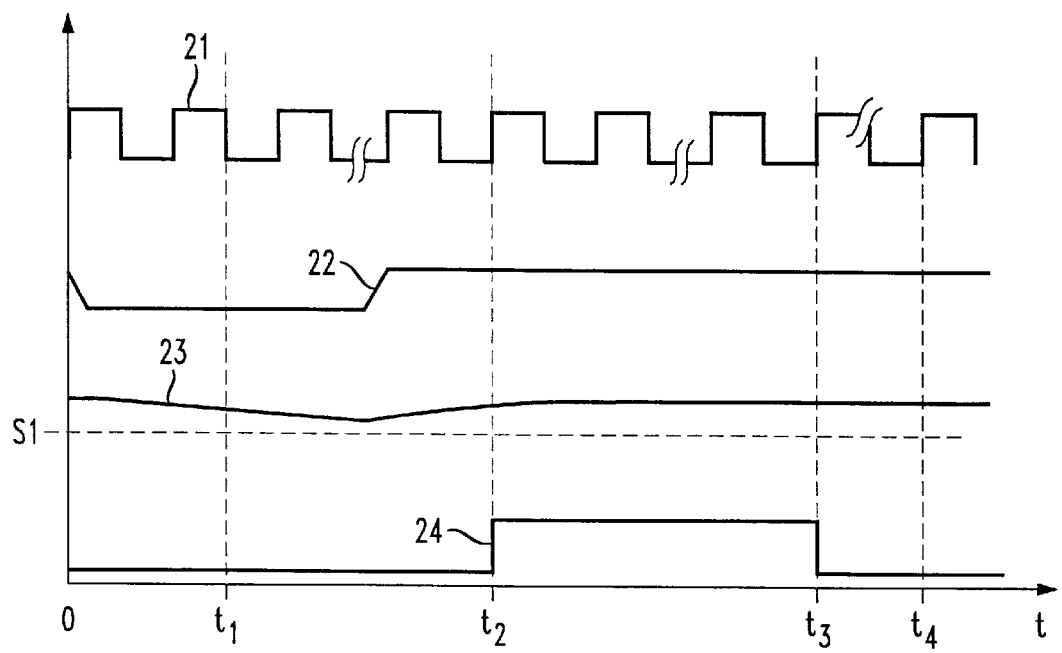
FIG. 2 illustrates a timing diagram for a synchronous resetting of the circuit of FIG. 1.

FIG. 2 illustrates a timing diagram of the essential signals that come into play during a synchronous resetting of the microprocessor 1. Timing signal 21 represents the clock signal CLK internal to the microprocessor 1. Since the synchronous resetting is being examined here, it is assumed that the internal clock is present from the very outset of the periods considered. It is also assumed that the microprocessor 1 has been on for a certain period of time.

Timing signal 22 represents the external resetting signal RSTE. This signal is active when its signal level is low. The curve 23 shows the development of the potential Vpp measured at the node 12 of FIG. 1. Here too, at the outset of the periods of time considered, the potential Vpp is high. The capacitor 16 of FIG. 1 has had time to charge. Timing signal 24 represents the resetting signal internal to the microprocessor 1. This signal is active when its level is high. FIG. 2 thus illustrates the evolution of these four signals in time. The time axis considered can be subdivided into five clearly observable time intervals marked by intervals t1, t2, t3 and t4.

Interval t1 represents the minimum duration during which the external resetting signal must be active so that it can be taken into account by the rest of the circuit. This time is generally equal to at least two internal clock signals for most microprocessors.

The time interval included between intervals t1 and t2 correspond to the time needed for the microprocessor 1 to carry out the last write operations. The time interval between intervals t1 and t2 is generally equal to six clock cycles of the clock internal to the microprocessor 1. The external resetting signal may possibly be released during this time interval.

The period of time between intervals t2 and t3 is the time during which the internal resetting signal is active. This time represents the duration of the internal resetting sequence. This time interval typically lasts 512 clock cycles of the clock internal to the microprocessor 1.

The following time interval, included between intervals t3 and t4, correspond to the usual workings of the microprocessor 1. The internal resetting signal is no longer active.

The curve 23 represents evolution of potential Vpp as a function of time. This curve 23 clearly shows, in accordance with the explanations given in the description of FIG. 1, that the potential Vpp diminishes when the external resetting signal is active. As soon as the external resetting signal becomes inactive, curve 23 increases towards the value Vcc.

In FIG. 2, the potential Vpp never falls below a threshold value S1 that is typically equal to 2.5 volts. Below this threshold value, the inverter 17 of FIG. 1 switches over and the asynchronous resetting signal ASYNC would go to a high level. This particular situation arises during a failure of the internal clock. Explanations in greater detail will be given with discussion of FIG. 4.

Moreover, FIG. 2 illustrates a situation where the external resetting signal is released before the end of the internal resetting sequence which is completed at the interval t3. Should the external resetting signal be released after the interval t3, the internal resetting signal remains active so long as the external resetting signal is active.

Figure 3:
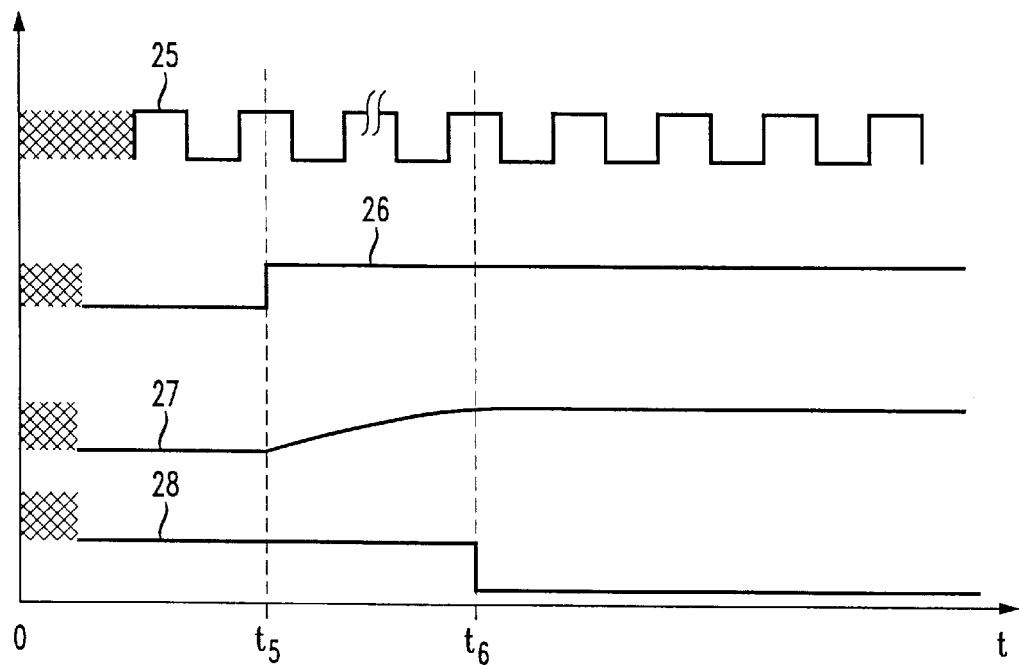
FIG. 3 illustrates a timing diagram for an asynchronous resetting of the circuit of FIG. 1.

FIG. 3 illustrates a timing diagram for an asynchronous resetting of the circuit of FIG. 1. The same signals shown in FIG. 2 are shown in FIG. 3. This figure therefore shows the timing signal 25 of the internal clock signal, the timing signal 26 of the external resetting clock signal, the curve 27 represents evolution of the potential Vpp in time, and the timing signal 28 of the internal resetting signal. The case here is that of asynchronous resetting.

The external resetting signal is active even before the setting up of the internal clock. In accordance with the explanations provided during the description of FIG. 1, it is seen that the internal resetting signal is also immediately active. When the external resetting signal becomes inactive, at the interval t5 in FIG. 3, the potential Vpp increases until it reaches its threshold value at the interval t6. The inverter 17 then switches over and a low level signal is produced at the output of the AND gate 18 of FIG. 1. The internal resetting signal is then inactive.

Figure 4:
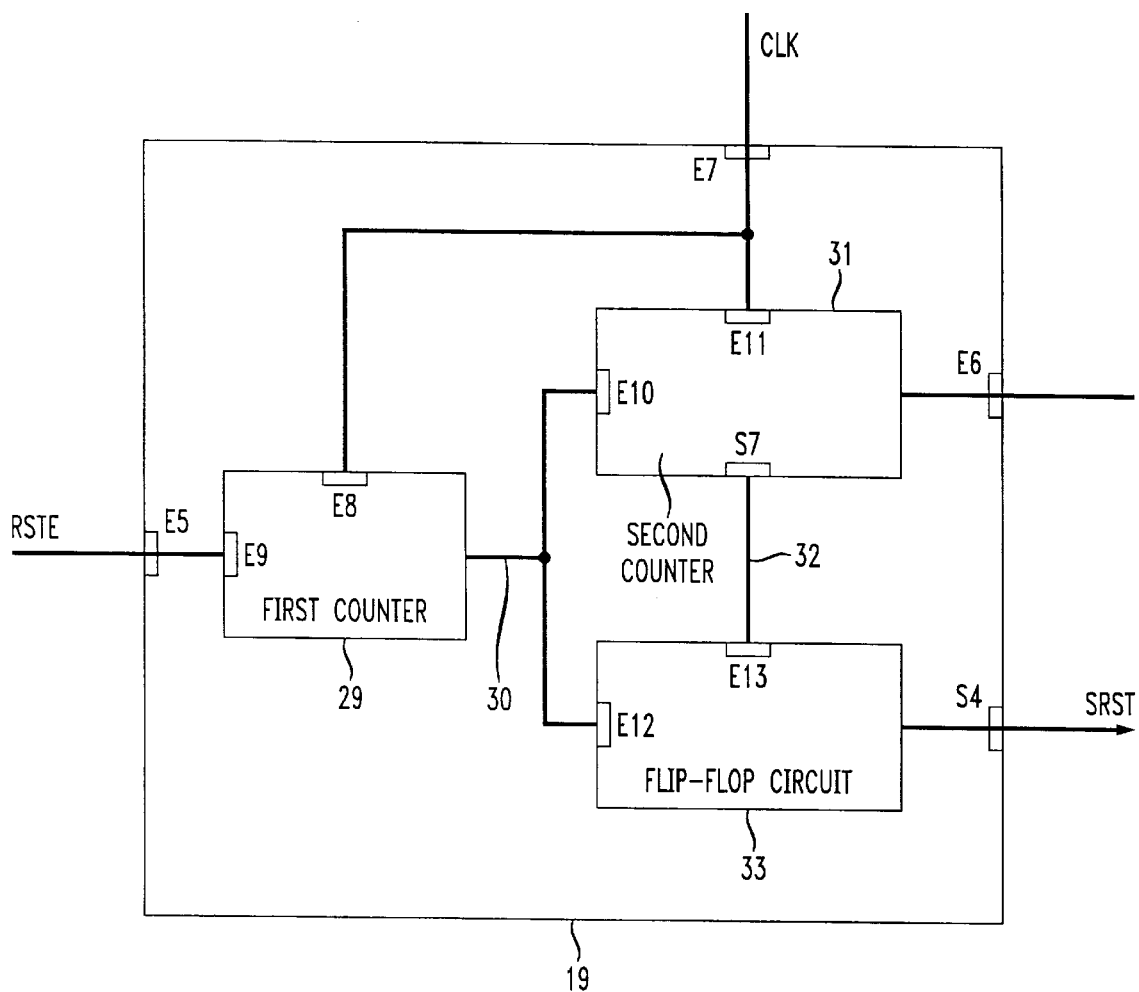
FIG. 4 illustrates a detailed block diagram of a delay circuit generating a synchronous resetting signal.

FIG. 4 illustrates a detailed block diagram of the delay circuit 19 for generating a synchronous resetting signal. Delay circuit 19 has three inputs E5, E6 and E7 which respectively receive the inverted external resetting signal, the asynchronous resetting signal ASYNC, and the internal clock signal CLK of the microprocessor. The delay circuit 19 is formed by three functional blocks: a first counter 29, a second counter 31, and a flip-flop circuit 33.

The first counter 29 is an asynchronous counter for receiving the internal clock signal CLK at a first input E8 and for receiving the inverted resetting signal at a second input E9. The first counter 29 generates an output signal 30 that is either a delayed inverted external resetting signal or a low level (zero) signal.

The second counter 31 is also an asynchronous counter. The second counter 31 receives three signals. They are the output signals 30 from the first counter 29 at a first input E10, the internal clock signal CLK at a second input E11, and the asynchronous resetting signal ASYNC at a third input E6. An output S7 of the second counter 31 generates a signal 32, which is called a validation signal.

The flip-flop circuit 33 is an RS flip-flop circuit for receiving the output signal 30 from the first counter 29 at a first input E12 and for receiving the validation signal 32 at a second input E13. Output S4 of the flip-flop circuit 33 is the output of the delay circuit 19. Output S4 delivers the signal SRST which is applied to an input of the OR gate 20.

To explain the working of the delay circuit 19, it is assumed that the internal clock signal CLK of the microprocessor 1 is active. It sets the rate of the first and second counters 29, 31. When the first counter 29 receives a high inverted resetting signal, six internal clock cycles occur before a high signal 30 is generated by the first counter 29. This time is the time needed for the microprocessor 1 to perform the last write operations in its registers.

When the output signal 30 of the first counter 29 goes to a high state, the flip-flop circuit 33 delivers a high internal resetting signal. Furthermore, when the signal 30 goes to a high state, it activates the second counter 31 which will typically wait for 512 internal clock strokes before generating a high validation signal 32. This validation signal 32 has the effect of bringing about a change in the state of the flip-flop circuit 31, which then goes to a low output level. A low output level marks the end of the internal resetting sequence.

It is the second counter 31 that determines the duration of the resetting sequence. It is therefore ensured, by the working of the delay circuit 19, that there will be an internal resetting sequence throughout the time needed to reach a predefined state which constitutes the default state of the microprocessor 1. This remains true even if the external resetting signal is active only for a brief instant.

When the asynchronous resetting signal ASYNC is active or when the internal clock is not present, the validation signal 32 goes to a high level and changes the state of the flip-flop circuit 33. The resetting mode is then asynchronous. The delay circuit 19 therefore delivers the internal resetting signal RSTI when the resetting is done in a synchronous mode.

The present invention has been presented in a preferred, but a non-restrictive embodiment. The primary circuit 2 could be applied to other types of microprocessors which, for example, do not have the same periods of resetting sequences. The external resetting signal RSTE could also be replaced by a watch-dog signal that is internal to the microprocessor 1.

What is claimed is:

1. A microprocessor comprising:
   a first input for receiving an external resetting signal generated external to the microprocessor;
   a second input for receiving a clock signal generated internal to the microprocessor;
   a third input for receiving a selection signal for setting the primary circuit in either a synchronous resetting mode or an asynchronous resetting mode;
   a circuit for generating an internal resetting signal for the microprocessor as a function of the external resetting signal and the clock signal such that there is a predetermined delay between receipt of the external resetting signal and generation of the internal resetting signal when the selection signal corresponds to the synchronous resetting mode; and
   an output for providing the internal resetting signal for resetting the microprocessor.

2. A microprocessor according to claim 1, further comprising a delay circuit comprising:
   a first counter having an input for receiving the external resetting signal and an output for providing the external resetting signal delayed by a predefined number of clock pulses;
   a second counter having an input for receiving the delayed external resetting signal and an output for providing a validation signal corresponding to a duration of a resetting sequence; and
   a flip-flop circuit having a first input for receiving the delayed external resetting signal from the output of the first counter, and a second input for receiving the validation signal from the output of the second counter, and an output for providing a synchronous resetting signal.

3. A microprocessor according to claim 2, wherein the delay circuit further comprises an input for receiving the clock signal for setting a rate of the first and second counters.

4. A microprocessor according to claim 2, wherein the first and second counters are asynchronous counters.

5. A microprocessor according to claim 1, further comprising a selection circuit for producing the selection signal dependent upon a measurement of a first voltage internal to the microprocessor.

6. A microprocessor according to claim 5, wherein the selection circuit comprises:
   a charging circuit having a charging duration greater than a duration needed for the microprocessor to save current operations in progress; and
   a discharging circuit for discharging the first voltage from the charging circuit according to a predefined time constant.

7. A microprocessor according to claim 6, wherein the charging circuit is an RC circuit.

8. A microprocessor comprising:
   a primary resetting circuit comprising
      a first input for receiving an external resetting signal generated external to the microprocessor,
      a second input for receiving a clock signal generated internal to the microprocessor, and
      a circuit for generating an internal resetting signal for the microprocessor as a function of the external resetting signal and the clock signal such that there is a predetermined delay between receipt of the external resetting signal and generation of the internal resetting signal when a selection signal corresponds to a synchronous resetting mode; and
   a selection circuit for producing the selection signal dependent upon a measurement of a first voltage internal to the microprocessor for setting the primary resetting circuit in either the synchronous resetting mode or an asynchronous resetting mode.

9. A microprocessor according to claim 8, wherein the selection circuit comprises:
   a charging circuit having a charging duration greater than a duration needed for the microprocessor to save current operations in progress; and
   a discharging circuit for discharging the first voltage from the charging circuit according to a predefined time constant.

10. A microprocessor according to claim 9, wherein the charging circuit is an RC circuit.

11. A microprocessor according to claim 8, wherein the primary resetting circuit further comprises a delay circuit comprising:
   a first counter having an input for receiving the external resetting signal and an output for providing the external resetting signal delayed by a predefined number of clock pulses;
   a second counter having an input for receiving the delayed external resetting signal and an output for providing a validation signal corresponding to a duration of a resetting sequence; and
   a flip-flop circuit having a first input for receiving the delayed external resetting signal from the output of the first counter, and a second input for receiving the validation signal from the output of the second counter, and an output for providing a synchronous resetting signal.

12. A microprocessor according to claim 11, wherein the delay circuit further comprises an input for receiving the clock signal for setting a rate of the first and second counters.

13. A microprocessor according to claim 11, wherein the first and second counters are asynchronous counters.

14. A method for generating an internal resetting signal for a microprocessor including a primary resetting circuit, comprising:
   receiving at a first input of the primary resetting circuit an external resetting signal generated external to the microprocessor;
   receiving at a second input of the primary resetting circuit a clock signal generated internal to the microprocessor;
   generating a selection signal for setting the primary resetting circuit in either a synchronous resetting mode or an asynchronous resetting mode;
   generating the internal resetting signal as a function of the external resetting signal and the clock signal such that there is a predetermined delay between receipt of the external resetting signal and generation of the internal resetting signal when the selection signal corresponds to the synchronous resetting mode; and
   providing the internal resetting signal for resetting the microprocessor.

15. A method according to claim 14, wherein generating the selection signal comprises measuring a first voltage internal to the microprocessor.

16. A method according to claim 15, further comprising:
   charging to the first voltage a charging circuit having a charging time greater than a duration needed for the microprocessor to complete current operations in progress; and
   discharging the charging circuit according to a predefined time constant.

17. A method according to claim 14, wherein generating the delayed internal resetting signal further comprises:
   receiving the external resetting signal at a first input of a first counter;
   delaying output of the external resetting signal at an output of the first counter by a predefined number of clock pulses;
   receiving the delayed external resetting signal at a first input of a second counter;
   generating a validation signal corresponding to a duration of a resetting sequence at an output of the second counter;
   receiving the delayed external resetting signal from the output of the first counter at a first input of a flip-flop circuit, and receiving the validation signal from the output of the second counter at a second input of a flip-flop circuit; and
   generating a synchronous resetting signal at an output of the flip-flop circuit.

18. A method according to claim 17, further comprising setting a rate of the first and second counters based upon the clock signal.

* * * * *